(12) United States Patent
Lee

(10) Patent No.: US 7,478,803 B2
(45) Date of Patent: *Jan. 20, 2009

(54) COMPACT SHOCK ABSORPTION, VIBRATION, ISOLATION, AND SUSPENSION DEVICE

(75) Inventor: Elmer Lee, Ann Arbor, MI (US)

(73) Assignee: Elmer C. Lee, Canton, MI (US)

( * ) Notice: Subject to any disclaimer, the term of this patent is extended or adjusted under 35 U.S.C. 154(b) by 756 days.

This patent is subject to a terminal disclaimer.

(21) Appl. No.: 10/403,850

(22) Filed: Mar. 31, 2003

(65) Prior Publication Data

US 2003/0230866 A1    Dec. 18, 2003

Related U.S. Application Data

(63) Continuation-in-part of application No. 09/715,353, filed on Nov. 17, 2000, now Pat. No. 6,543,791.

(60) Provisional application No. 60/370,905, filed on Apr. 8, 2002.

(51) Int. Cl.
*B60G 11/22* (2006.01)
*A63C 17/00* (2006.01)

(52) U.S. Cl. .................. 267/293; 267/141; 267/160

(58) Field of Classification Search ......... 152/270–274, 152/276, 277, 11, 31, 40, 42, 44, 48, 45, 152/47, 46, 69, 84, 76, 20, 77, 18, 78, 17, 152/43, 41; 267/141, 152, 160, 153, 292–294, 267/140.4, 140.5, 30; 384/535, 544, 536; 192/37; 264/334–337; 280/11.19–11.34, 280/11.225; 301/5.301–5.309, 124.1, 125, 301/6.91; 193/37; 198/624; 492/28; 464/72, 464/94
See application file for complete search history.

(56) References Cited

U.S. PATENT DOCUMENTS

| | | | | |
|---|---|---|---|---|
| 698,110 A | | 4/1902 | Foy | |
| 1,120,156 A | * | 12/1914 | Palmer | 152/31 |
| 1,314,337 A | * | 8/1919 | Kimmey | 152/31 |
| 1,522,168 A | * | 1/1925 | Young | 152/31 |
| 1,711,819 A | * | 5/1929 | White | 152/40 |
| 2,206,230 A | * | 7/1940 | Ogdin | 152/253 |
| 2,241,685 A | | 5/1941 | Ware | |
| 2,635,923 A | | 4/1953 | Isham et al. | |
| 3,185,532 A | * | 5/1965 | Erwin | 384/215 |
| 3,243,008 A | | 3/1966 | Müller | 180/73 |
| 3,389,922 A | | 6/1968 | Eastin | |
| 3,424,448 A | * | 1/1969 | Chak Ma | 267/35 |
| 3,465,804 A | * | 9/1969 | Dupre | 152/11 |
| 3,951,422 A | | 4/1976 | Hornsby | |
| 4,000,912 A | | 1/1977 | Donald et al. | |

(Continued)

FOREIGN PATENT DOCUMENTS

DE    1226432 B    10/1966

(Continued)

*Primary Examiner*—Melody M Burch

(57) ABSTRACT

A compact shock absorption, vibration, isolation, and/or suspension device is provided having long life and increased performance in a compact design. The device of the present disclosure is both less expensive and simpler to manufacture. In addition to being able to be used as a shock absorber in the hub of a wheel of an in-line skate, scooter or other small wheeled vehicle, the device of the present disclosure may be used in locations outside a wheel hub as well as in non-wheel devices where there is a need to isolate, damp, and absorb shock and/or vibrations experienced by a component of the device in order to minimize their effect on the entirety of the device.

12 Claims, 15 Drawing Sheets

U.S. PATENT DOCUMENTS

| | | | |
|---|---|---|---|
| 4,090,283 A | 5/1978 | Woolley | |
| T981,004 I4 * | 4/1979 | McNeely et al. | 384/536 |
| 4,272,091 A | 6/1981 | Reid, Jr. | |
| 4,294,491 A | 10/1981 | Black | |
| 4,402,521 A | 9/1983 | Mongeon | |
| 4,403,784 A | 9/1983 | Gray | |
| 4,471,935 A * | 9/1984 | Chiba et al. | 248/638 |
| 4,535,827 A * | 8/1985 | Seaford | 152/7 |
| 4,645,223 A | 2/1987 | Grossman | |
| 4,699,432 A | 10/1987 | Klamer | |
| 4,790,520 A | 12/1988 | Tanaka et al. | 267/140.1 |
| 4,871,152 A | 10/1989 | Funahashi | 267/140.1 |
| 4,893,798 A * | 1/1990 | Hibi et al. | 267/140.12 |
| 4,898,403 A | 2/1990 | Johnson | |
| 4,915,399 A | 4/1990 | Marandel | |
| 5,029,822 A | 7/1991 | Marandel | |
| 5,037,073 A * | 8/1991 | Matsumoto et al. | 267/140.12 |
| 5,102,107 A | 4/1992 | Simon et al. | 267/152 |
| 5,104,201 A | 4/1992 | Ross | |
| 5,135,244 A | 8/1992 | Allison | |
| 5,180,176 A | 1/1993 | Chen | |
| 5,259,600 A * | 11/1993 | de Fontenay et al. | 267/220 |
| 5,308,152 A | 5/1994 | Ho | |
| 5,330,208 A | 7/1994 | Charron et al. | |
| 5,372,170 A * | 12/1994 | Hynes | 152/42 |
| 5,390,892 A * | 2/1995 | Platus | 248/619 |
| 5,393,078 A | 2/1995 | Bourdeau | |
| 5,398,948 A | 3/1995 | Mathis | |
| 5,405,156 A | 4/1995 | Gonella | |
| 5,411,287 A | 5/1995 | Henschen | 280/717 |
| 5,503,413 A | 4/1996 | Belogour | |
| 5,551,713 A | 9/1996 | Alexander | |
| 5,575,489 A | 11/1996 | Oyen et al. | |
| 5,582,418 A | 12/1996 | Closser | |
| 5,704,620 A | 1/1998 | Oliemans et al. | |
| 5,704,621 A | 1/1998 | Lazarevich et al. | |
| 5,791,665 A | 8/1998 | Mayer, II | |
| 5,823,543 A | 10/1998 | Burns et al. | |
| 5,842,687 A | 12/1998 | David | 251/140.5 |
| 5,853,225 A | 12/1998 | Huang | |
| 5,904,360 A | 5/1999 | Oliemans et al. | |
| 5,906,360 A * | 5/1999 | Kanda | 267/140.12 |
| 5,918,889 A | 7/1999 | Tai | |
| 5,922,151 A | 7/1999 | Piper et al. | |
| 5,954,317 A | 9/1999 | Meyer et al. | 267/140.12 |
| 6,227,622 B1 | 5/2001 | Roderick et al. | |
| 6,322,153 B1 | 11/2001 | Lund | |
| 6,367,819 B1 | 4/2002 | Andersen et al. | 280/11.28 |
| 6,543,791 B1 * | 4/2003 | Lee | 280/11.223 |
| 6,543,792 B1 | 4/2003 | Maurice | 280/11.225 |
| 2003/0230866 A1 * | 12/2003 | Lee | 280/124.165 |

FOREIGN PATENT DOCUMENTS

| | | |
|---|---|---|
| DE | 19746192 A1 | 5/1999 |
| EP | 0279131 | 3/1991 |
| EP | 0769313 | 4/1997 |
| EP | 0799629 | 12/1999 |
| JP | 4272527 A * | 9/1992 |
| WO | 95/17231 | 6/1995 |
| WO | 97/45179 | 12/1997 |
| WO | 98/09691 | 3/1998 |
| WO | 98/36807 | 8/1998 |
| WO | 99/02227 | 1/1999 |
| WO | WO 03/087618 A2 * | 10/2003 |

* cited by examiner

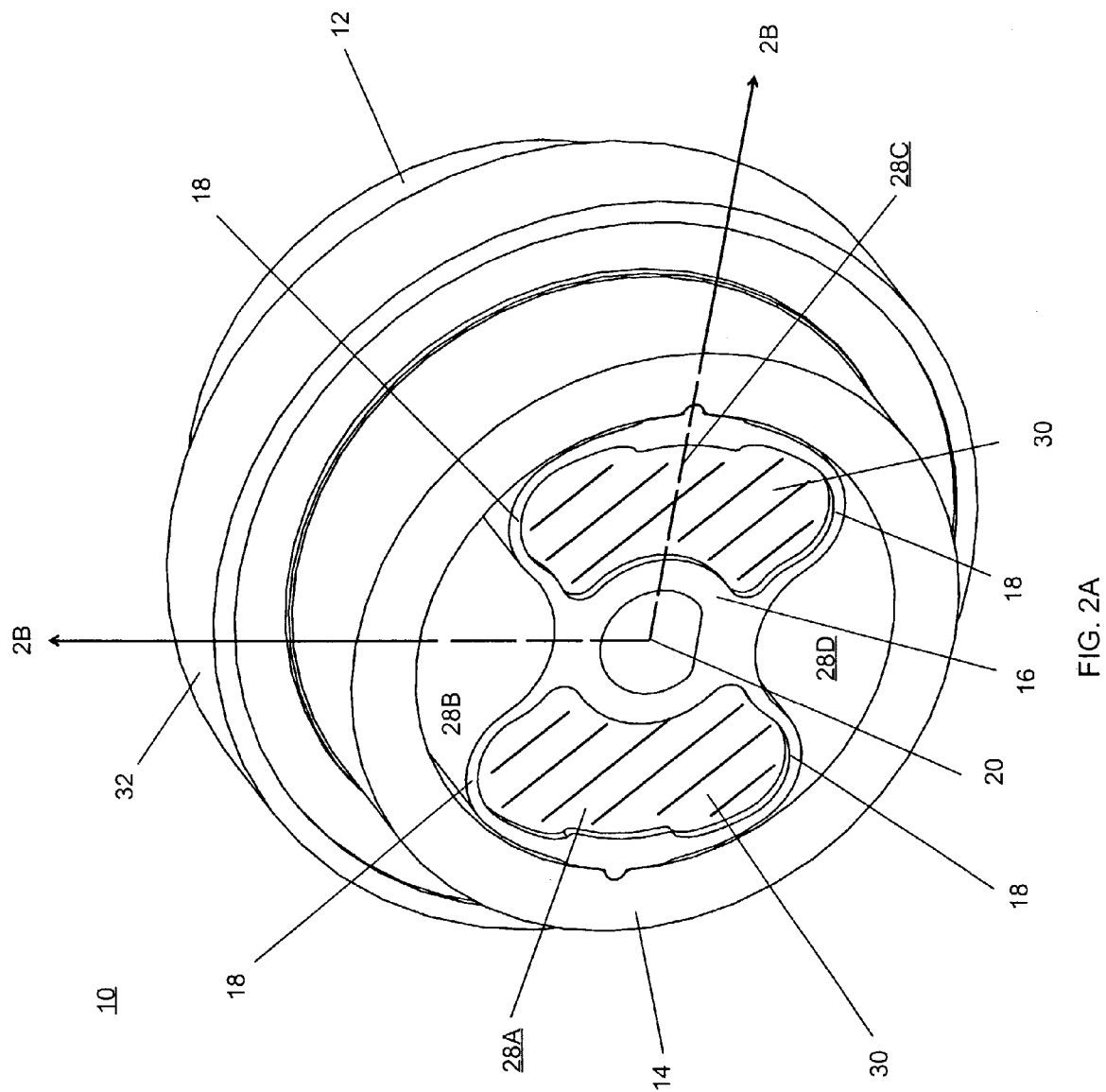

COMPACT SHOCK ABSORPTION, VIBRATION, ISOLATION, AND SUSPENSION DEVICE

CROSS-REFERENCE TO RELATED APPLICATIONS

This patent application is a continuation-in-part of U.S. Utility patent application Ser. No. 09/715,353, filed in the U.S. Patent and Trademark Office on Nov. 17, 2000, now U.S. Pat. No. 6,543,791, and claims priority to provisional patent application No. 60/370,905, filed Apr. 8, 2002, the entire contents of which are incorporated herein by reference.

BACKGROUND

1. Technical Field

The present disclosure relates generally to a compact shock absorption, vibration, isolation, and/or suspension device, and more particularly to an assembly involving a compliant material in shear and a flexure mechanism for inhibiting movement of an axle passing through the shock absorption device in all rotational and translational degrees of freedom except the direction of disturbance or vibration.

2. Background of Related Art

While inline skating has enjoyed significant success with current technology, an almost perfectly smooth pavement is still required to fully enjoy this activity. This has limited inline skating to well-maintained parks and recreational areas. Roads that feel perfectly comfortable to users on cars and bikes leave inline skaters shaken and frustrated.

One reason for this problem is that existing inline skates do not contain any shock absorbing system, relying only on the elasticity of the tire on each wheel to perform this function. While a number of shock absorbing systems have been proposed over the years for inline skates, these have involved modifying the skate itself by adding heavy and bulky springs, dampers, and the like to the skate truck or frame. However, none of these systems are currently being commercially used, primarily because the added weight and complexity which they add to the skate are not offset by the advantages they provide. The reliance on tire resiliency to absorb road variations also is disadvantageous in that it requires the use of tires which have some softness and resiliency, for example a durometer in the 65A-75A range. However, such softer tires result in more tire deformation as it contacts the road surface, requiring the user to exert more energy and thus limiting the speed attainable with the skate. A harder tire, for example a tire with a durometer in the 85A-100A, range would provide a faster skate, while requiring the use of less energy by the skater. The absence of an effective shock absorber system on inline skates also results in vibration passing into a user's feet and legs, even on relatively smooth pavements, these vibrations contributing to skater fatigue over time.

Problems similar to those described above exist for other transport devices, particularly ones having small wheels similar to those of inline skates. Such transport devices could include scooters, street skis, some skateboards, and the like.

A need therefore exists for an improved shock absorbing system for use in inline skates and related transportation devices which does not result in any appreciable increase in either weight or bulk for the device, and is relatively simple and inexpensive, while still being capable of absorbing a substantial portion of road vibration without reliance on the tires of the wheels, so as to facilitate a smoother ride on all surfaces while permitting harder, faster tires to be utilized.

SUMMARY

Accordingly, a compact shock absorption, vibration, isolation, and/or suspension device is provided which overcomes the disadvantages and drawbacks of the prior art. U.S. Pat. No. 6,543,791 discloses an axle shock absorber including a flexure mechanism for inhibiting movement of an axle passing through the shock absorber in all rotational degrees of freedom and in all translational degrees of freedom, except that in which shock and vibrations are to be absorbed or damped and in which, where the shock absorber also functions as a suspension mechanism, also compensates for unevenness in the travel path. While the shock absorber in the co-pending application has many advantages over prior art devices of this type, it has been found that the design of this device may be significantly enhanced to provide substantially longer life for the device, to enhance its functions by providing significantly greater travel path within the shock absorber without increasing the size thereof and to make the device both easier and less expensive to manufacture. It has also been found that, while the shock absorber of the existing application is primarily intended for use in the hub of the wheels for in-line skates, scooters or other small wheeled vehicles, the teachings of the invention have far broader application and may be used for wheels in locations in addition to inside the wheel hub and in most other non-wheel devices where there is a need to isolate/damp/absorb shock and/or vibrations experienced by a component of the device so as to minimize their effect on the entirety of the device.

The foregoing and other objects, features and advantages of the invention will be apparent from the following more particular description of various preferred embodiments of the invention as illustrated in the accompanying drawings, the same or similar reference numerals being used for like elements in the various figures.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings, as set forth below.

FIG. 2A is a perspective view of a non-monolithic embodiment of a shock absorber in accordance with the principles of the present disclosure;

DETAILED DESCRIPTION OF THE EXEMPLARY EMBODIMENTS

Figure 1A:
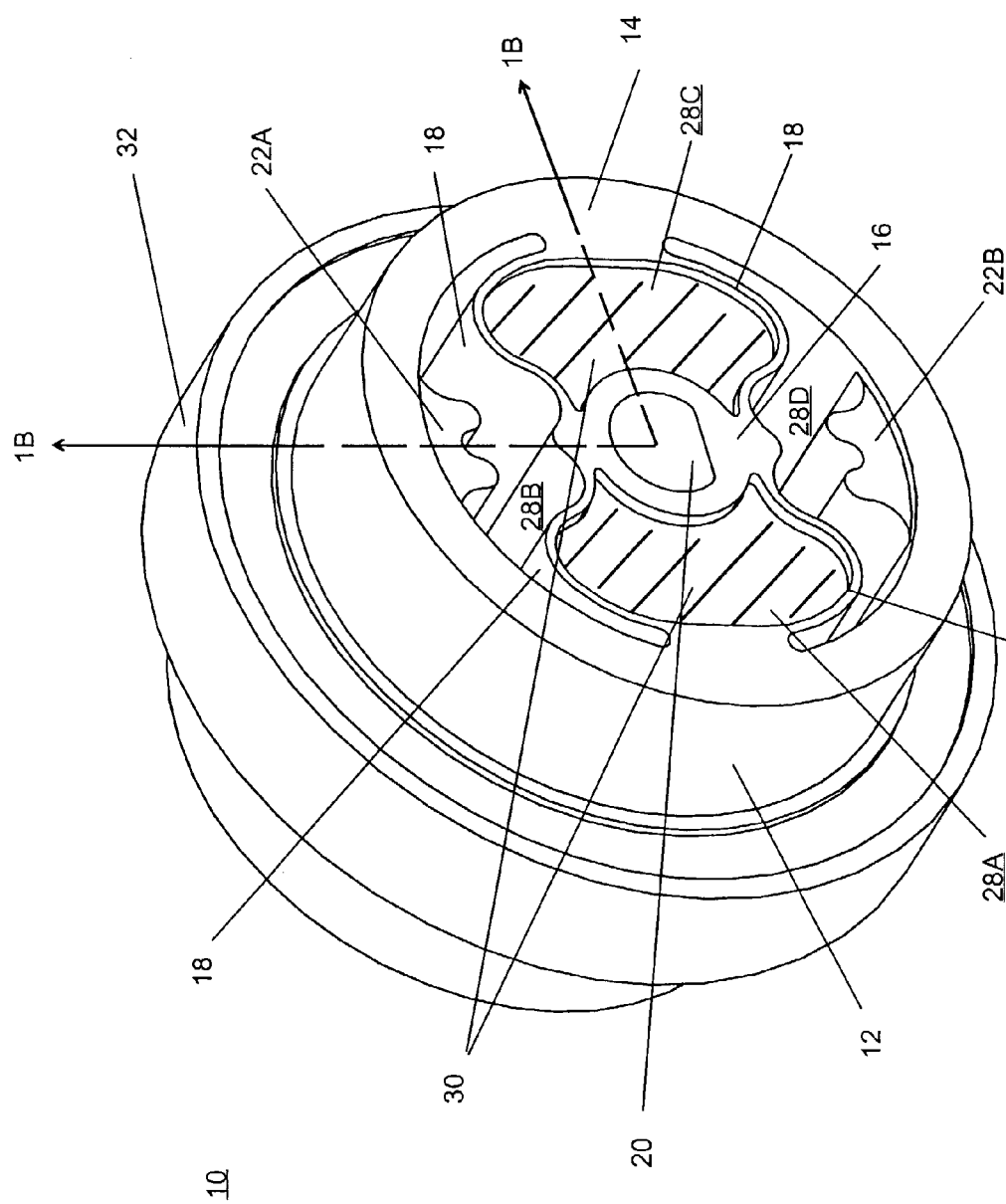
FIG. 1A is a perspective view of a monolithic embodiment of a shock absorber in accordance with the principles of the present disclosure.

The following discussion includes a description of compact shock absorption, vibration, isolation, and/or suspension devices, in accordance with the principles of the present disclosure. Reference will now be made in detail to the exemplary embodiments of the disclosure, which are illustrated in the accompanying figures.

Turning now to the figures, wherein like components are designated by like reference numerals throughout the several views, the exemplary embodiments of the compact shock absorption, vibration, isolation, and/or suspension device and methods of use disclosed are discussed in terms of shock absorption devices for the hubs of the wheels for in-line skates, scooters or other small wheeled vehicles, in terms of locations inside and outside wheel hubs and non-wheel devices, and in terms of shock absorption where there is a need to isolate, dampen, and/or absorb shocks and vibrations experienced by a component of a device within a wheel, outside a wheel or without the use a wheel. It is envisioned that the present disclosure may be employed as a shock absorption device including and excluding the use of a wheeled element.

Figure 1B:
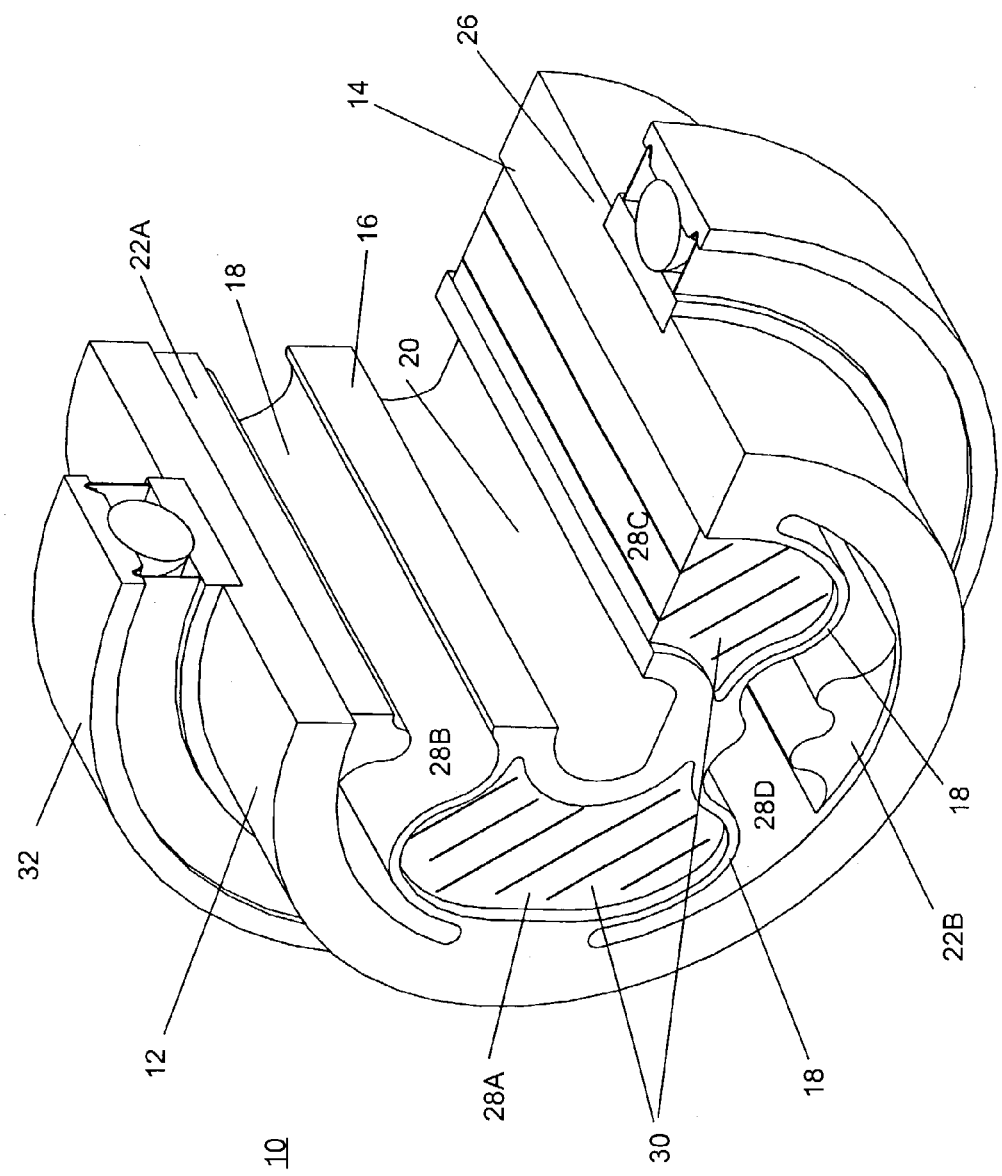
FIG. 1B is a perspective view with a cutaway section of the shock absorber according to FIG. 1A.

Referring initially to FIGS. 1A-1B, a preferred embodiment of the invention is disclosed. The shock absorber 10 for this embodiment of the invention includes an integrated core structure 12 having an outer structure 14 and an inner structure 16 which are interconnected by four curved, bent or arched flexures 18. Inner structure 16 includes a keyed channel 20 formed therethrough which is adapted to receive a correspondingly keyed shaft or axle. The geometry of channel 20 assures that shock absorber 10 is always mounted with a desired orientation. Shock absorber 10 also includes an upper bumper 22A and a lower bumper 22B, which bumpers may be formed integrally with structure 12 or may be a separate component added thereafter. Bumpers 22A and 22B define the travel path of flexure mechanism 12. The path is generally from the top outer surface of structure 16 touching bumper 22A to the bottom outer surface of structure 16 contacting bumper 22B. Bumpers 22A and 22B are expected to deform when contacted by structure 16. A channel 26 is adapted to receive a bearing member. As with the embodiments of the co-pending patent application, where shock absorber 10 is mounted in the hub of a wheel, a bearing element may be mounted over outer wall 14 abutting shoulders formed by channel 26. As will be discussed herein, a channel 26 may not be required where the shock absorber 10 is not mounted in the hub of a wheel.

While structures 14 and 16 for the preferred embodiment of FIG. 1 are substantially cylindrical, this is not a limitation on the invention and these structures may assume a variety of shapes, including an oval cross section, a square or rectangular cross section or any other cross section appropriate for a given application. Outer structure 14 may, for example, be shaped to fit within a housing in which it is to be utilized.

Flexures 18 divide the space between structures 14 and 16 into four chambers 28A-28D. In a preferred embodiment, chambers 28A and 28C are filled with a low durometer elastomer material 30, while chambers 28B and 28D are empty (i.e., have for example unconfined air therein). However, for other embodiments of the present disclosure, chambers 28B and/or 28D may also be filled with a material having a selected elasticity, for example, a low durometer elastomer, air or other gas confined in a bladder or other suitable confining structure or a constrained, compressible fluid, for example, a gel having microbeads of a compressible gas suspended therein. While the filling of chambers 28B and/or 28D with a compressible substance may be utilized in lieu of the use of an elastomer in chambers 28A and 28C, in the preferred embodiments, the low durometer elastomer would continue to be used in chambers 28A and 28C in conjunction with the use of the compressible substance in chambers 28B and/or 28D.

The embodiment of FIGS. 1A-1B includes a number of advantageous features. For example, flexures 18 are curved or arched sufficiently so that they remain bent through the entire travel path (i.e., through the entire movement of inner structure 16 between bumpers 22A and 22B). This permits maximum movement within the shock absorber for absorbing shock and vibration. The design allows the travel path to be at least 50% of the spacing between the bumpers (i.e., the maximum possible travel path) and preferably 80% to 100% of the maximum travel path. The junctions between flexures 18 and structures 14 and 16 are also shaped to minimize stress induced by the bending of flexures 18. The curved flexures and their specific joint orientation provide stress relief, and result in the flexures and their joints always being in a pure bending mode and never under direct tension. This results in significantly enhanced durability and longevity for the shock absorption device.

Elastomers 30 being only in chambers 28A and 28C undergo only sheer rather than compression forces, and thus do not function to limit the travel path of the shock absorber 10. However, it is desirable that the maximum travel path be permitted while not having the shock absorber bottom out under normally anticipated loading. Both the spring stiffness of the flexures and the durometer of the elastomer can be selected to achieve this objective. However, since the loading on the shock absorber may vary with application, it is sometimes desirable to permit this stiffness to be field or use varied. This may be achieved, for example, by controlling the elasticity of the compressible substance placed in chambers 28B and/or 28D. For example, where an air filled bladder is used in these chambers, the air pressure in this bladder may be controlled to control spring stiffness. Spring stiffness may also be controlled by having flexures of different stiffness, by using elastomers of different durometer or in other ways known in the art.

While for the preferred embodiments, the core shock absorber structure 12 is formed as a monolithic structure, this is not a limitation of the present disclosure. In some applications, it may be preferable that structures 14, 16 and flexures 18 be of different materials in order to improve performance and/or durability of the device, allow the device to be more easily manufactured, and/or allow the device to be manufactured less expensively. In such applications, or in others where a non-monolithic flexure mechanism is desired, each of the structure 14 and 16 and flexures 18 may be individually formed by a suitable process, and then secured together by a suitable process, for example by heat staking, ultrasonic welding or securing with a suitable adhesive. Such non-monolithic flexure mechanism may be manufactured using a plastic such as a super tough, high fatigue life polyamide or polycarbonate, a metallic alloy, such as a high yield strength spring steel or stainless steel, or a super elastic nickel-titanium alloy, or a composite material such as one made of carbon fibers, graphite fibers or glass fibers.

Figure 2B:
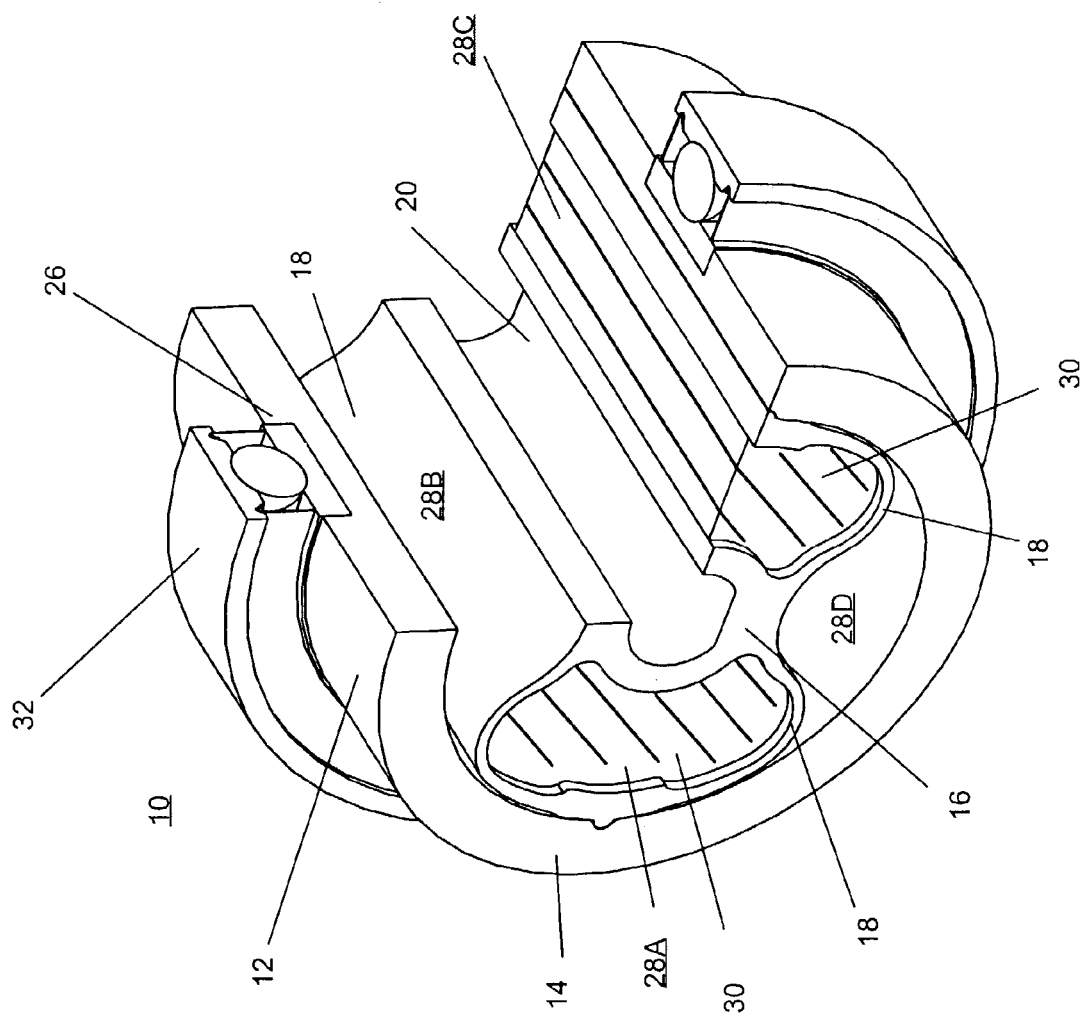
FIG. 2B is a perspective view with a cutaway section of the shock absorber according to FIG. 2A.
Figure 2C:
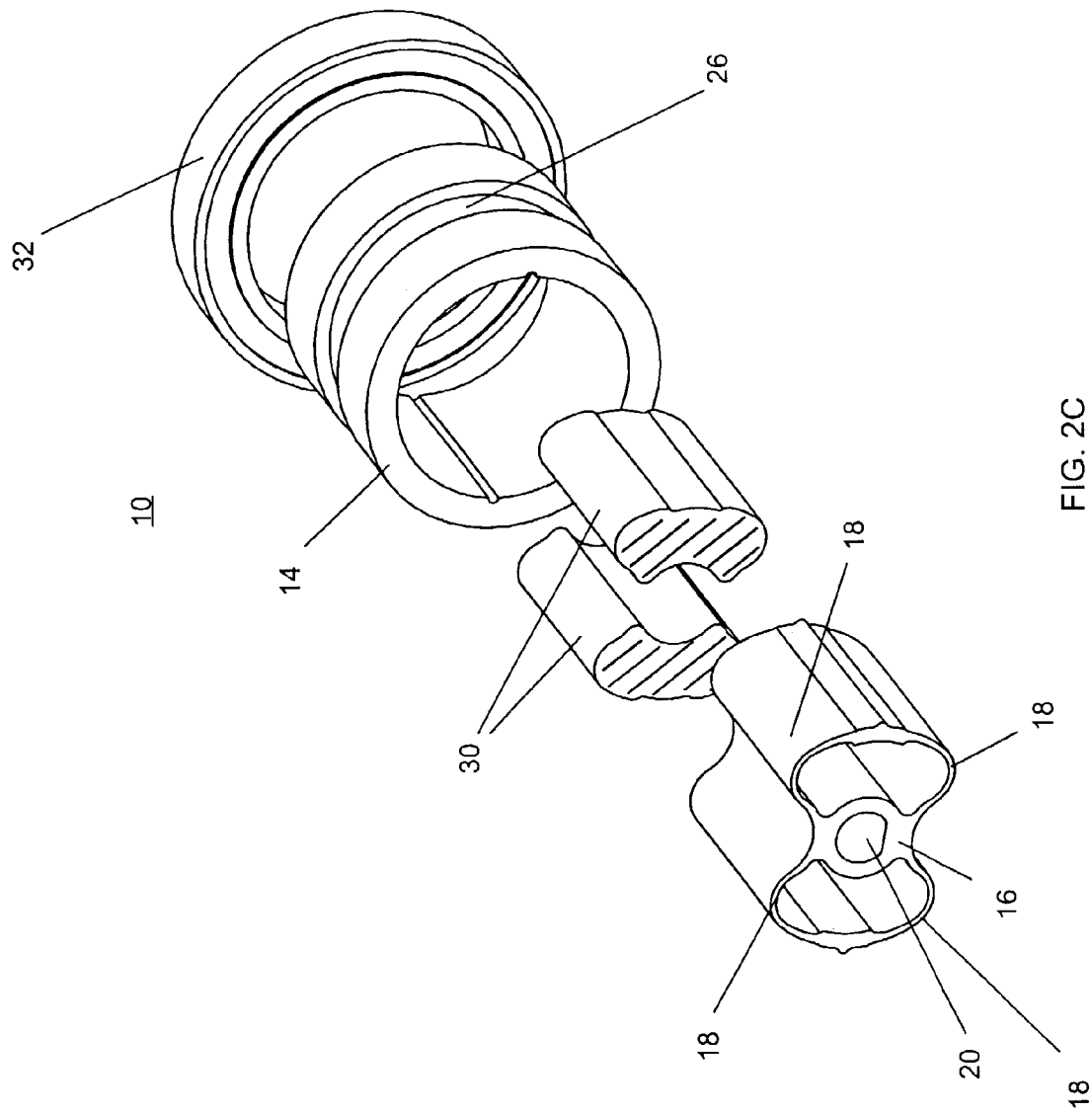
FIG. 2C is an exploded perspective view detailing the components of the shock absorber according to FIG. 2A.

Turning now to FIGS. 2A-2C, a non-monolithic embodiment of the shock absorber 10 is disclosed. Shock absorber 10 incorporates a two piece core structure 12 which is comprised of an outer structure 14 and integrated flexures 18 and inner structure 16 with a similar keyed channel 20 as shown in FIG. 1. The functionality of this embodiment is identical to the embodiment discussed at FIGS. 1A and 1B. Chambers 28A and 28C may be filled with a low durometer elastomer 30, which will supply the shock absorber with its desired spring stiffness. Chambers 28B and 28D may be left empty as shown or supplied with a bumper element similar to the embodiments of FIGS. 1A and 1B. A channel 26 is situated in outer structure 14 and can accommodate the seating of a bearing element 32. As described earlier, the integrated component composed of the flexures 18 and inner structure 16 may be assembled onto outer structure 14 in a variety of ways including ultrasonic welding, adhesives and/or mechanical fastening.

Figure 3A:
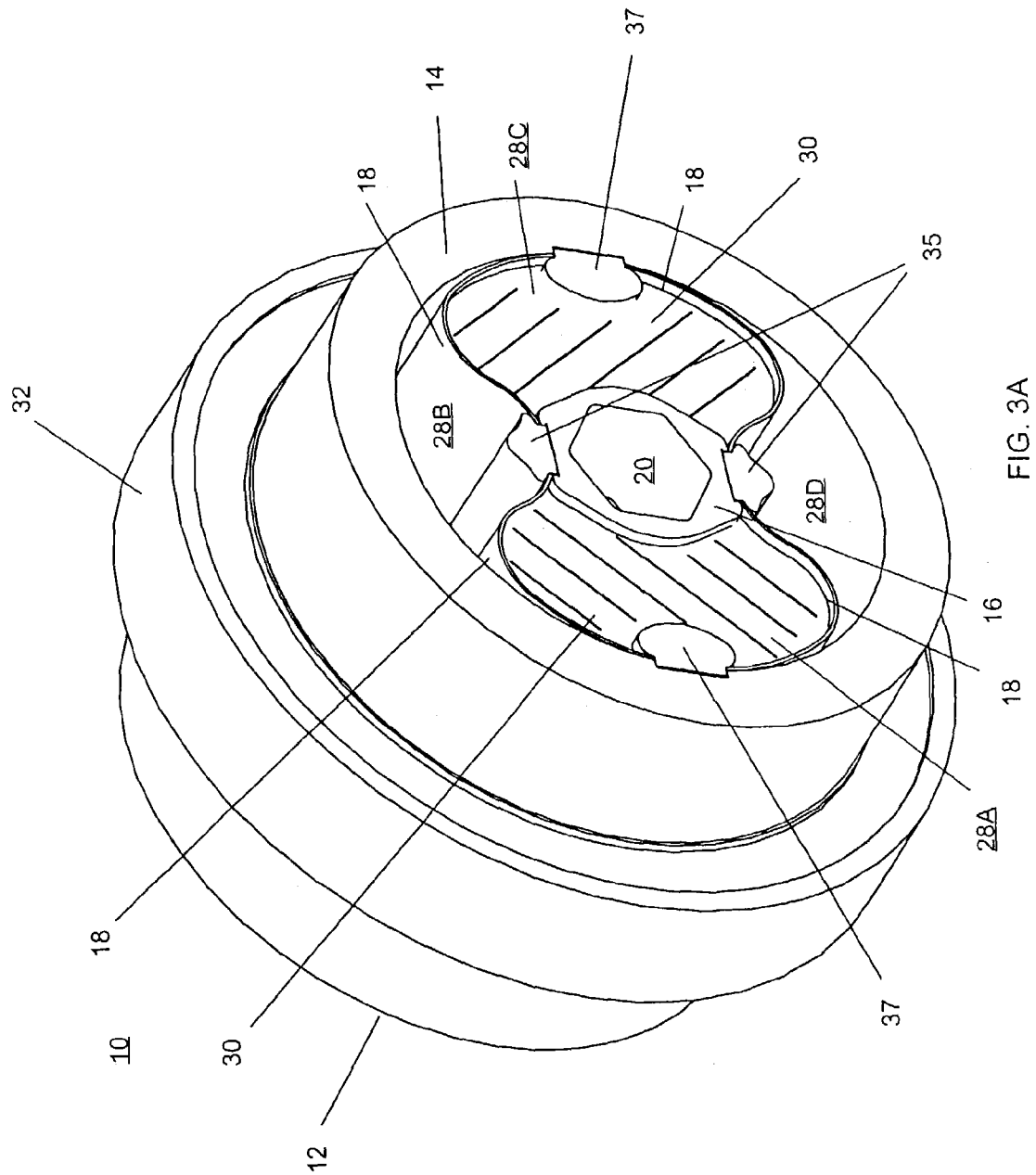
FIG. 3A is a perspective view of an alternative non-monolithic embodiment of a shock absorber in accordance with the principles of the present disclosure.
Figure 3B:
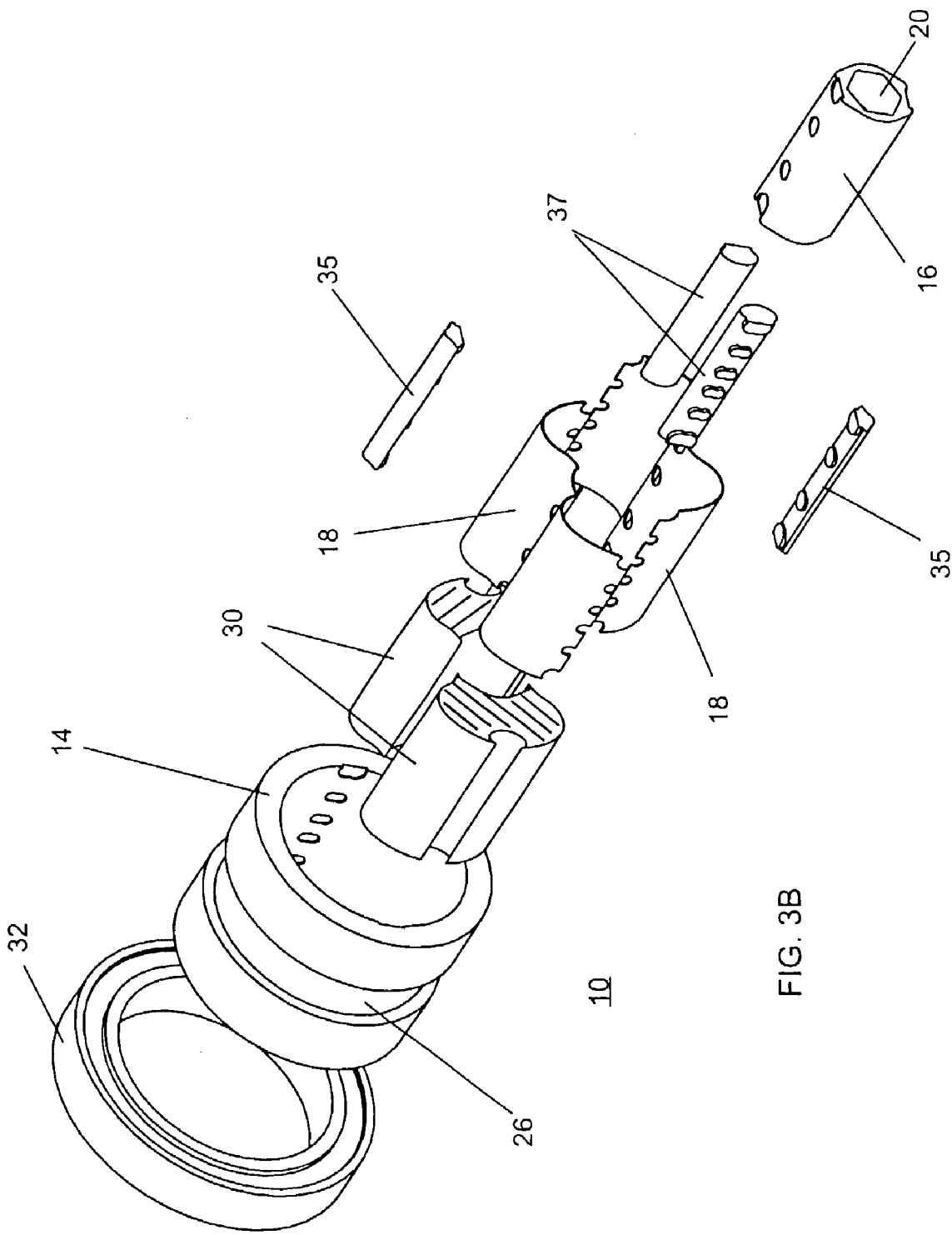
FIG. 3B is an exploded perspective view detailing the components of the shock absorber according to FIG. 3A.

FIGS. 3A-3B illustrate an alternative non-monolithic embodiment of the shock absorber 10. In this embodiment, the flexures 18 can be manufactured separate for all other components of the core structure 12. Flexures 18 can be stamped from a sheet of the appropriate material, either a plastic or a metallic alloy, formed to the correct shape and subjected to the correct heat treatment if necessary. Flexures 18 can be formed in two pieces and assembled end to end as shown in FIG. 3B or it can be formed using a single continuous piece. Assembling flexures 18 to the core structure 12 can be done through the methods described above, or it can be done through an insertion molding process whereby flexures 18 is inserted into the mold used to form outer structure 14 and inner structure 16. The material used to mold the inner and outer structures 14 and 16 will also flow through apertures strategically placed in the flexures 18, and when solidified will lock the flexures 18 securely into inner and outer structure 14 and 16. Elements 35 and 37 illustrate locking structures that can be used to hold flexures 18 to the inner and outer structures 14 and 16.

As in FIGS. 1A-1B and FIGS. 2A-2C, the flexures 18 create a four chamber arrangement in core structure 12. The two side chambers, 28A and 28C, may be filled with a low durometer elastomer 30. The upper and lower chambers, 28B and 28D, may be left empty or have bumpers or other similar elements placed therein as shown in FIGS. 1A-1B and described earlier. A keyed channel 20 is located in inner structure 16, the geometry of which is used to correctly orient the shock absorber 10 while in use. A channel 26 is placed into the outer structure 14 where a single bearing 32 may be seated and held in place.

Figure 4A:
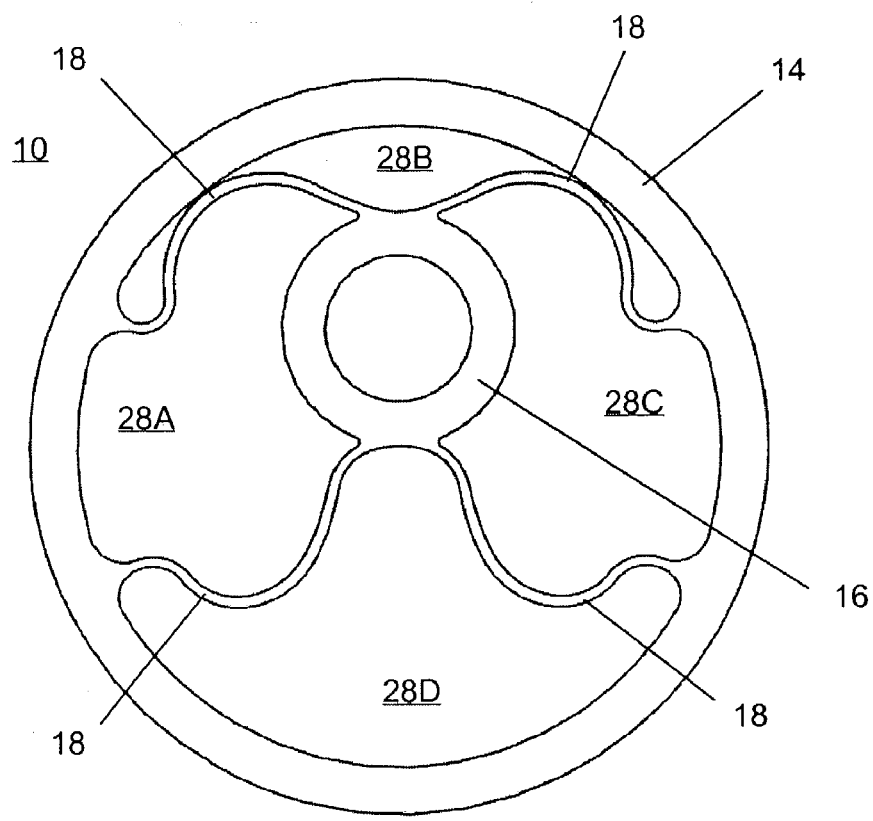
FIGS. 4A and 4B are side planar views of the flexure profiles in the unloaded and loaded state, respectively, in accordance with the principles of the present disclosure.
Figure 4B:
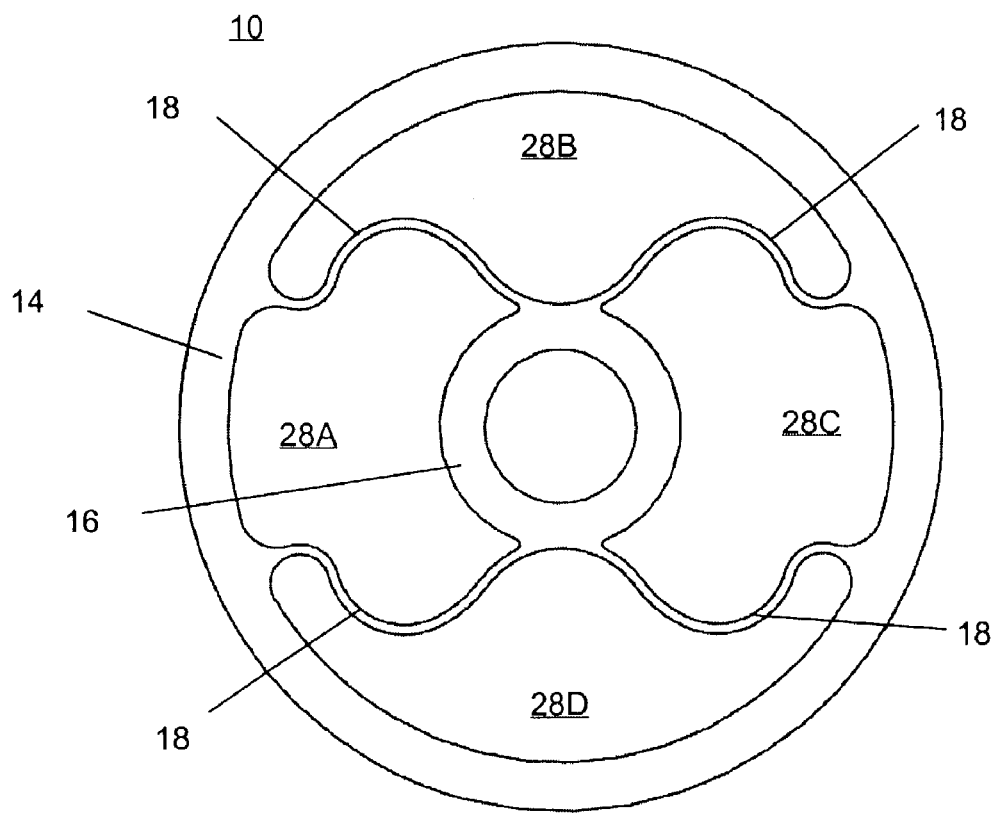

FIGS. 4A and 4B illustrate a way in which the length of the travel path may be enhanced. While bumpers 22A, 22B are not shown in FIGS. 4A and 4B, such bumpers could also be used with this embodiment. As previously noted in the description of FIGS. 1A-1B, the shock absorber 10 is not under a load. Upon the addition of a load, for example, a person stands up and starts skating on an inline skate having the shock absorber of this invention mounted in its hub, inner structure 16 will move down toward bumper 22B, resulting in a shorter shock absorbing distance. In the present embodiment as shown in FIG. 4A, structures 14 and 16 are not concentric, that is, the centroid of structure 16 is above that of structure 14 when the shock absorber is in an unloaded state. Conversely, the centroid of structures 14 and 16 are substantially closer to one another, if not aligned, when the load is applied to the shock absorber (FIG. 4B). As previously noted, the spring stiffness of the shock absorber may be controlled in various ways to ensure that the condition of FIG. 4B (i.e., substantially closer or aligned centroids) is achieved for a given individual, object or other normal load applied to the shock absorber.

Figure 5A:
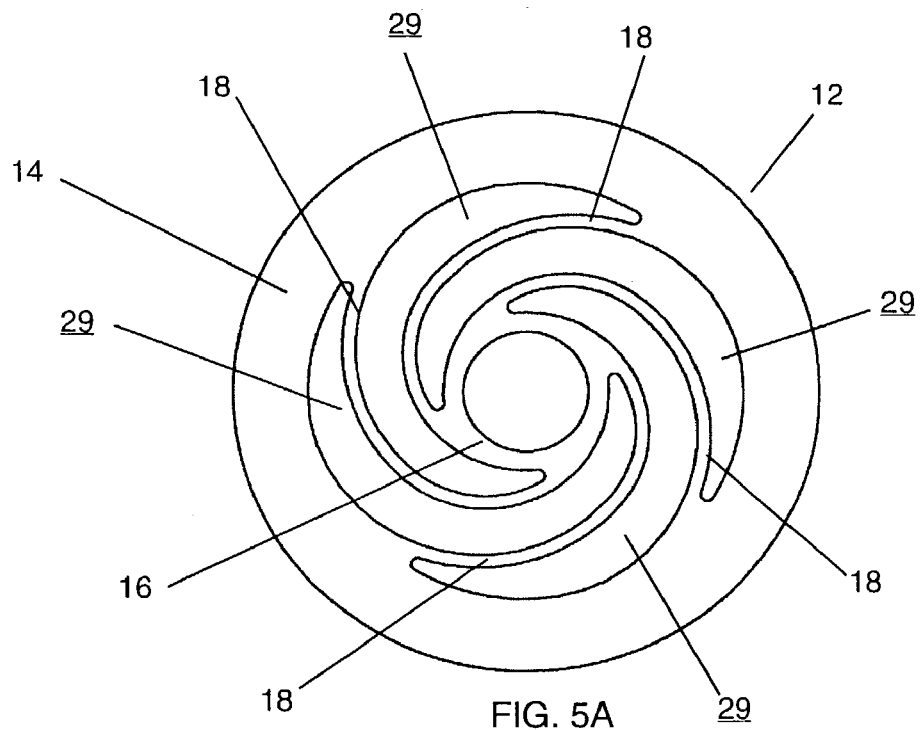
FIGS. 5A-5G are side planar view of alternative flexure profiles of a shock absorber in accordance with the principles of the present disclosure.
Figure 5B:
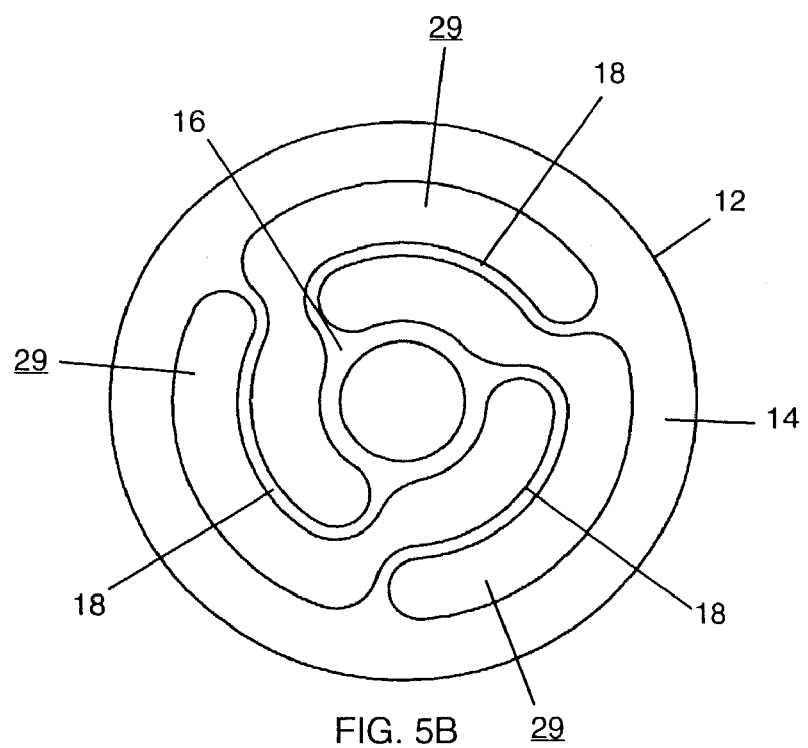
Figure 5C:
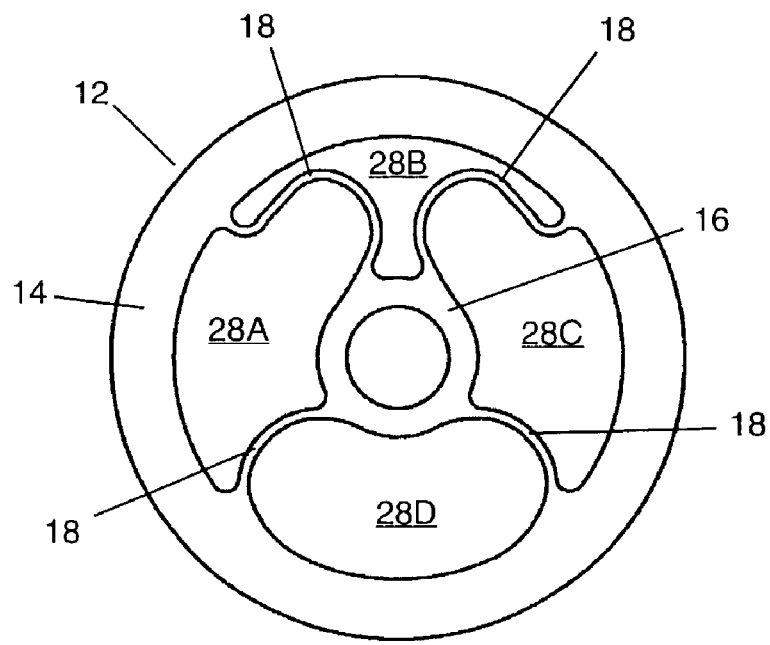
Figure 5D:
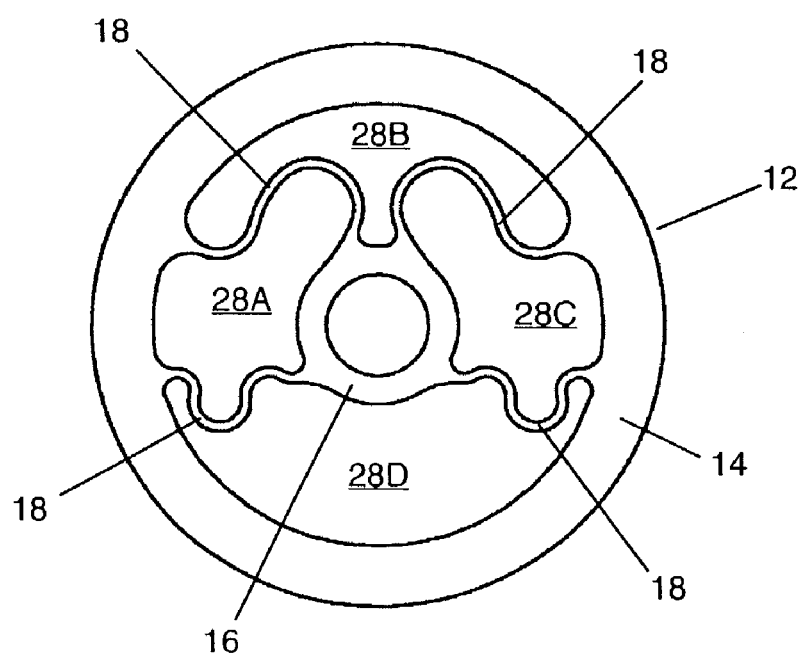
Figure 5E:
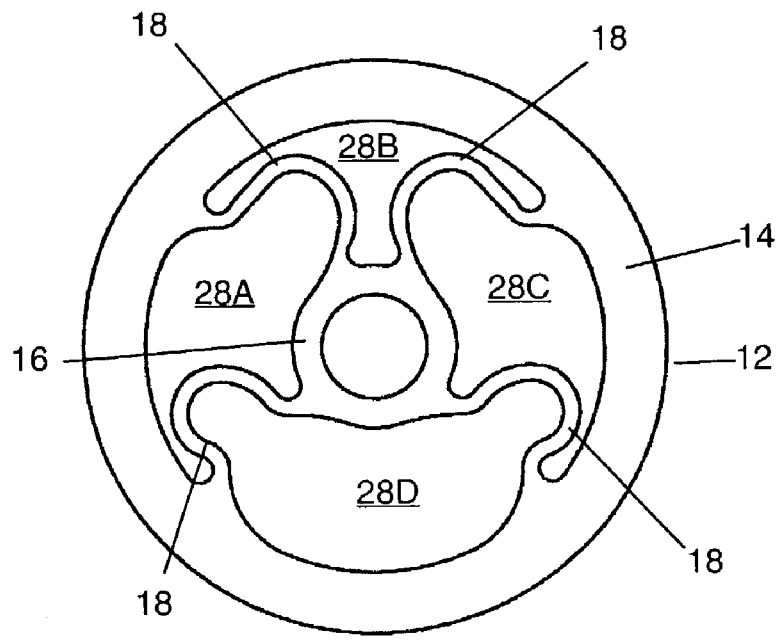
Figure 5F:
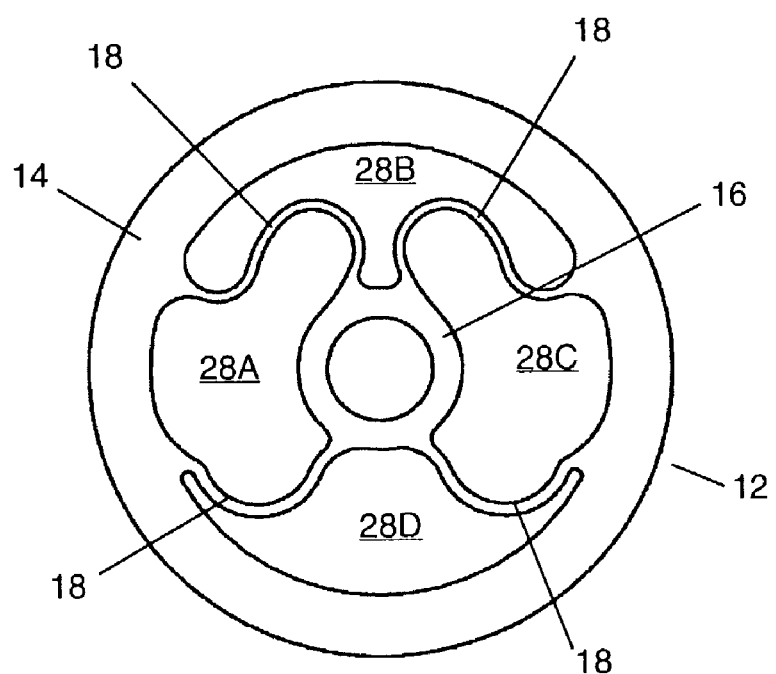
Figure 5G:
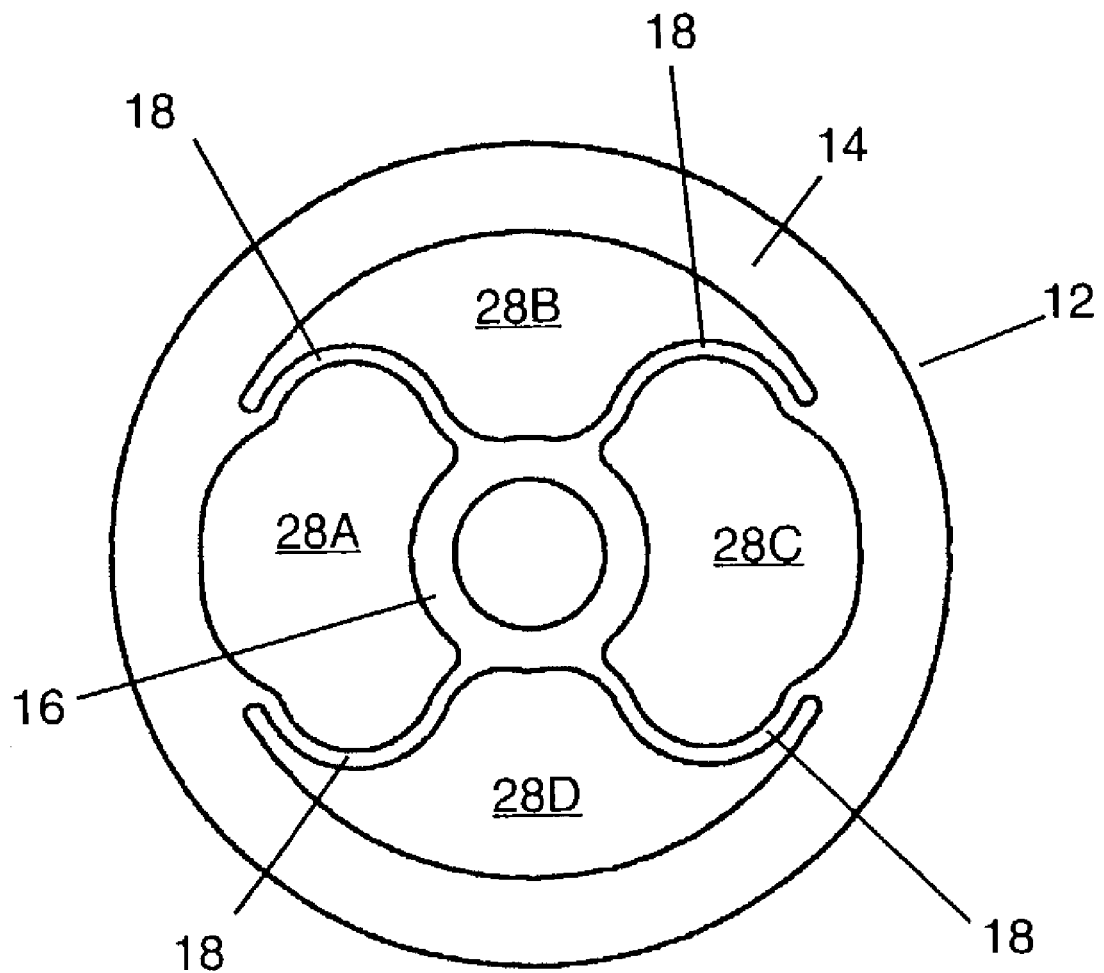

FIGS. 5A-5G illustrate various alternative configurations for the flexure profile 18. FIGS. 5A and 5B illustrate a significantly symmetric design which does not need to be oriented in any particular direction. Chambers 29, formed by flexures 18, are filled with a highly compressible medium such as an aerated foam or a gas-filled gel. Similar to the embodiments of FIGS. 1A and 1B, the embodiments of FIGS. 5C-5G further illustrate oriented configurations of flexures 18 and chambers 28. Flexures 18 form four chambers in which, an elastomer 30 (not shown) is preferably located in side chambers 28A and 28C. As previously discussed, chamber 28D will include a compressible substance. Each of these structures may similarly be offset as discussed in the embodiments of FIGS. 4A and 4B.

Figure 6A:
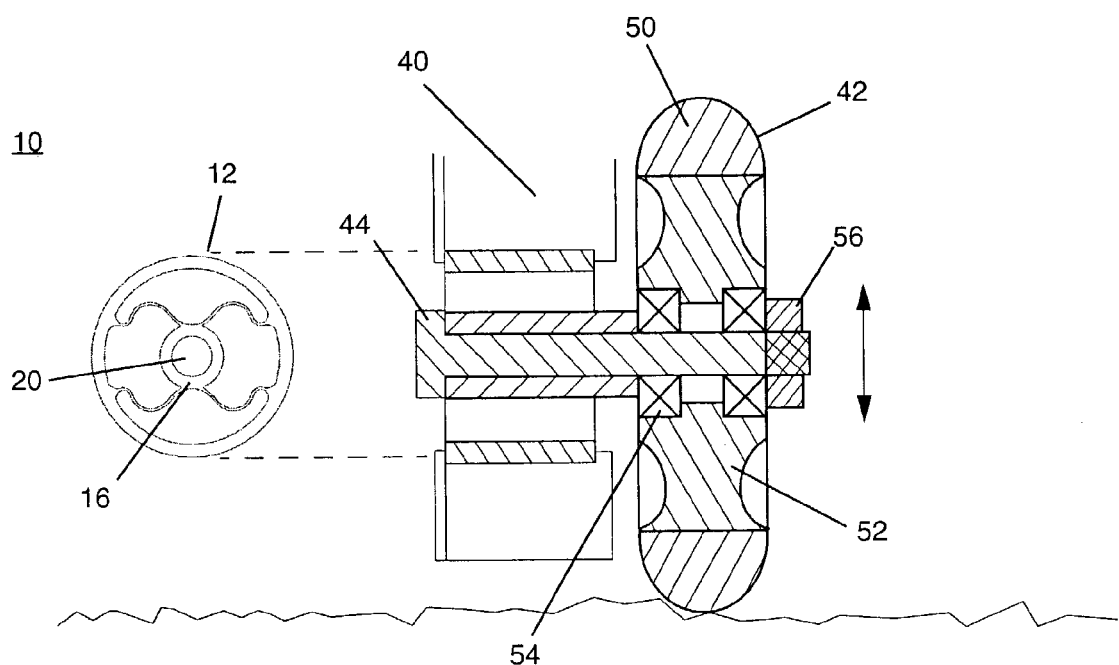
FIGS. 6A-6C are partial cross-sectional views illustrating the different mounting configurations which exist outside a wheel hub for a shock absorber, according to the principles of the present disclosure.
Figure 6B:
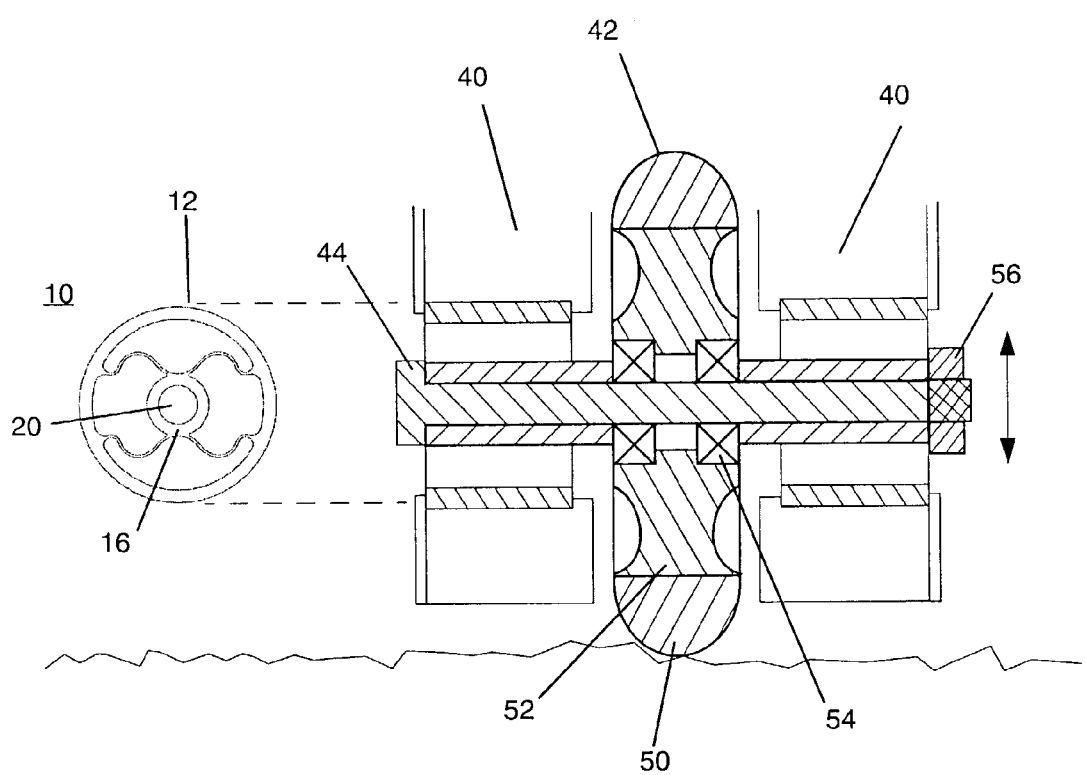
Figure 6C:
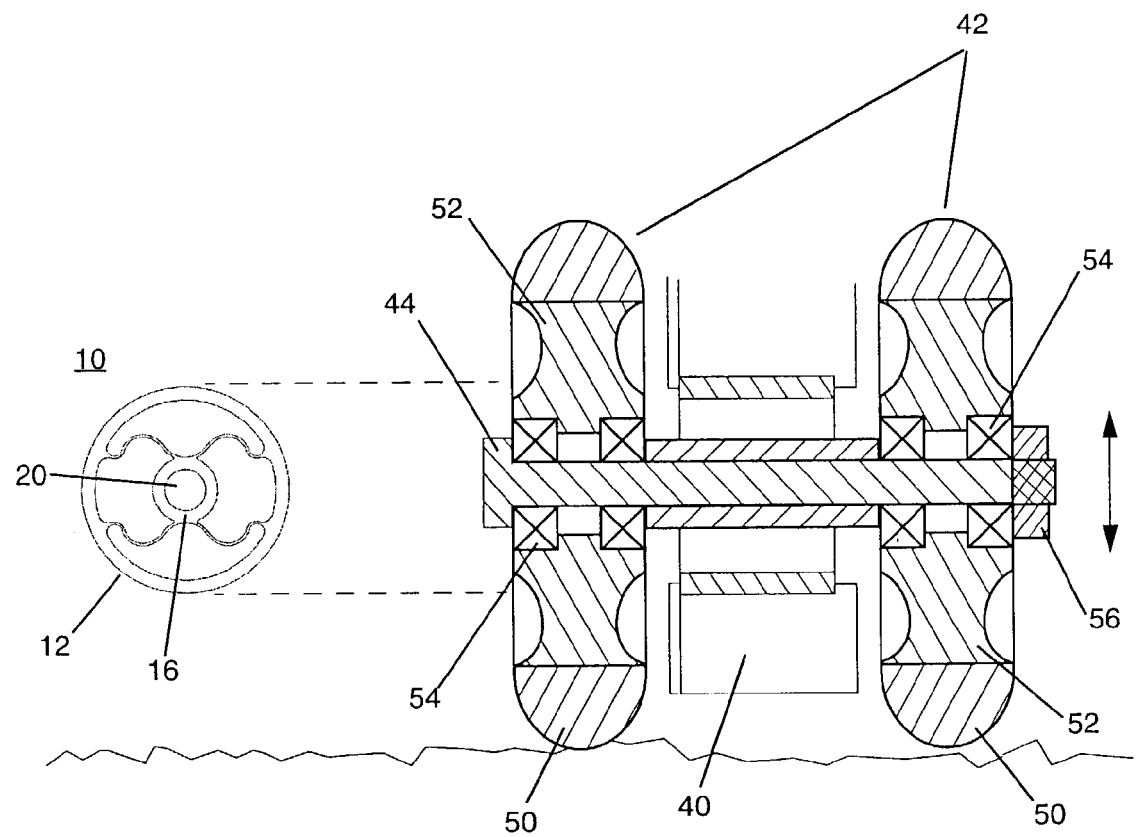

Turning now to the embodiments of FIGS. 6A-6C, shock absorber 10 is outside a wheel member 42 hub and within an internal opening formed in a housing 40. Wheel member 42 may be retained onto a shaft or axis portion 44 by a retaining nut 56 or other known means. Wheel member 42 may also include a tire member 50, wheel hub 52 and bearing members 54. Bearing members 54 are in rotational communication with shaft portion 44. Shaft portion 44 passes through channel 20 within inner structure 16.

Shock absorber 10 constrains movement of shaft portion 40 in the same manner as a hub mounted shock absorber. That is, wheel 42 is constrained to move in substantially a vertical direction while the shaft does not undergo any significant rotational or transverse motion in other directions. Where wheel 42 is being used for example on a conveyor belt or other application and is not rolling on a surface to transport an individual or object, the direction at which a force or other disturbance, or some form of vibration may be applied to the wheel may be other than vertical, and the shock absorber 10, may be oriented so as to permit movement in the direction of such disturbance and in no other direction. It is also possible that shock absorber 10 might be used in other applications, such as for mounting a chair, machinery, or other object which may be subject to shock or vibration which it is desired to damp or eliminate, the object being connected by a shaft passing through the shock absorber to a housing or other structure subject to shock and vibration, for example, the floor of a building or vehicle. Such uses of the shock absorber of this invention are also within the contemplation of the invention.

The monolithic core mechanism 12 is preferably formed by a molding process, for example, an injection molding process, a multi-cavity tool or mold being used to form the structure. Where an offset structure such as that shown in FIG. 4A is desired, there are at least two possible ways in which this objective can be achieved. One way is for the structure to be initially molded to its unloaded off-centered shape shown in FIG. 4A. The elastomer material 30 can then be placed into the correct chambers or cavities 28A and 28C using an injection molding process, a poured, open mold process or an insertional process.

Alternatively, the structure 12 can be molded to its loaded centered shape shown in FIG. 4B. The inner structure 16 can then be displaced upward and the flexures deflected accordingly. Elastomer material 30 can then be placed into the proper cavities 28A and 28C in a liquid uncured condition and allowed to cool, cure or bond to the flexure walls. The stiffness of the elastomer material 30 is great enough to maintain the off-centered shape against the force of the flexures attempting to return it to its original molded configuration (FIG. 4B). An advantage of this method includes less stress in the flexure members when in use due to less displacement of the flexures from their originally molded position for the flexure mechanism to move through its entire travel path than where the flexure mechanism is initially molded to its off center position shown in FIG. 4A.

There are also many ways in which the highly compressible or low durometer elastomeric material can be placed into the cavities or chambers 28 and 29. The method used may be governed by the form in which the spring or elastomer material is received. If the spring material is an elastomer based material, an injection molding process may be used to mold a thermoplastic elastomer with the correct material properties into the core cavities. Once the elastomer has cooled, the part can be removed from the mold and ready for the next step. Another method includes using a thermoset elastomer with the correct material properties and pouring the liquid into the desired cavities. Once the elastomer is allowed to solidify and cure, the part can be removed and readied for the next step. In still another method, the elastomer or other spring material can be preformed, either through a molding process or an extrusion process, cut to the proper length and secured into the desired cavities 28 using adhesives or other fastening mechanisms. The part can then be removed and readied for the next step. If the spring material is some other component, such as a gas-filled bladder or a semi-compressible liquid material, the manufacturing process may be adapted to include the necessary procedures.

The top and bottom bumpers 22A and 22B may be placed into the cavities or chambers 28 and 29 in multiple ways. If a molding process is used for the spring or elastomer material, the bumpers can be molded into the correct position at the same time, particularly if the spring or elastomer and the bumper material are identical. If the materials are not identical, then the bumpers can be molded after the spring material is molded. Alternatively, the bumpers can also be preformed, either by a molding process, an extrusion process, or other suitable process, cut to the proper length and then attached in the desired positions through adhesives or other mechanical fastenings. If an element, such as a gas-filled bladder, is in the cavities or chambers, for example, chamber 28D, then the placement of the bumper will not be necessary. Assuming material compatibility, bumpers 22 may also be molded as part of core structure 12.

In an alternate embodiment a compact shock absorption device is incorporated into a compatible wheel design for use, for example, in an inline skate wheel. Prior art inline skate wheels utilize well established industry sizes, for instance, wheels diameters from about 72 mm to 82 mm and a width of about 25 mm. An inline skate wheel is normally composed of a number of components. The first being a hub that can accommodate bearings on either side thereof. The conventional bearing used in an inline skate is a metric 608zz bearing, which has a inner bore diameter of 8 mm and outer diameter of 22 mm and a width of 7 mm. This 608zz bearing also includes a shield member installed at either side in order to protect it from foreign matter. During assembly, a spacer member is placed between the two bearings in order to support the bearings when subjected to lateral loads and forces. A poured urethane is molded around the hub to serve as the tire and rolling surface of the inline skate wheel. The urethane may include various durometer or hardness ratings ranging from 68A to as high as 82A. Lastly, an inline skate wheel includes an axle portion including a threaded end portion and an appropriately sized mating nut or the like for securing the wheel onto the inline skate.

Such compact shock absorption device as incorporated into an inline skate wheel is compatible with existing inline skates. That is, the width, wheel diameter, and general shape are substantially unchanged from prior art inline skate wheels. The shock absorption device and inline skate wheel of the present disclosure utilizes, for example, a larger 6806zz bearing having dimensions of 42 mm (OD)×30 mm (ID)×7 mm (WD). The wheel device also includes a single bearing configuration, which is centered directly in the middle of the width of the wheel. This single bearing approach provides an increased capacity to withstand thrust and torque loads.

In conventional inline skate wheels, bearings are held in place by a press fit into the hub. The bearings are further secured by the skate itself once the wheel is installed and the mounting bolt is tightened. According to the present disclosure, the shock absorption device as incorporated into an inline skate wheel retains its single bearing in place by providing one side of the hub with a raised shoulder against which the bearing can be lodged. On the other side of the hub, there is a threaded or grooved region where a retaining ring can lock in. The retaining ring includes a mating thread or groove on a portion of its outer diameter, which will allow it to be inserted into the appropriate portion of the hub and removed when necessary. In addition, on the outer diameter of the retaining ring there exists a ring of elastomeric material. The elastomeric material is designed to compress as the ring is inserted and provide friction between the ring and the hub so that the ring will not loosen during normal use. The inner diameter of the retaining ring includes a particularly shaped groove, detent or the like so that tool of a corresponding shape can be inserted or placed to aid in the tightening of the retaining ring onto the hub. When the retaining ring is locked in place, the bearing is securely held resulting in no wiggle or looseness of the bearing with respect to the hub.

Conventional inline skate wheels are manufactured in a two step process. The hub member, which is usually made of plastic is injection molded. The hub member is then placed into a mold and the urethane material is poured around the hub and allowed to cure. Once cured, the part is removed. Because of the inaccuracy of the pouring process, the wheel must go through a trimming process to remove excess urethane material normally situated on one side of the wheel, i.e., the side facing the mold opening.

The manufacturing process of the shock absorption device as incorporated into an inline skate wheel according to the present disclosure utilizes a similar technique. The modified hub is injection molded and placed into an open mold into which the urethane material is poured around the hub and allowed to cure. The wheel is then taken out and trimmed of excess material. However, in order to form the threaded or grooved portion of the hub of the present disclosure, the following manufacturing methods are disclosed. The first method includes molding the threaded or grooved portion at the same time as the rest of the hub. This technique requires an additional step of unscrewing the hub in order to remove the hub after it has solidified. A second method includes cutting or forming the threads during the final trim process of the wheel. If the hub is correctly oriented during the urethane mold operation, the face that needs to be trimmed is also be the side of the hub where the threads need to be placed. Since it is already on a lathe or machine platform, a tool member is used to not only trim the wheel, but also cut the threads in the same operation. Such two operation step saves time and expense.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A shock absorption device comprising:
   an outer structural member;
   an inner structural member having a channel, the channel having a longitudinal axis;
   the outer structural member and the inner structural member forming a cavity therebetween;
   a flexure mechanism directly connected to the outer structural member and-the inner structural member,
   the flexure mechanism having a major transverse dimension parallel to the longitudinal axis, thereby inhibiting movement of the inner structural member relative to the outer structural member, except substantially in the direction of disturbance; and
   an elastomeric member housed within said flexure mechanism
   wherein said inner structural member is not concentric with said outer structural member when said shock absorption device is not under a load,
   wherein said flexure mechanism is comprised of individual flexures formed in a shape similar to the letter M or W.

2. A shock absorption device as claimed in claim 1 further including an axle member in the channel and oriented along the longitudinal axis.

3. A shock absorption device as claimed in claim 1 wherein said inner structural member is substantially concentric with said outer structural member when said shock absorption device is under a load.

4. A shock absorption device as claimed in claim 1 wherein said shock absorption device includes a spring stiffness which varies as a function of a load applied thereto.

5. A shock absorption device as claimed in claim 1 wherein said flexure mechanism further includes a space between said inner structural member and said outer structural member, wherein the space is at least partially filled by a substance having elastic properties.

6. A shock absorption device as claimed in claim 1 wherein said flexure mechanism further includes a space between said inner structural member and said outer structural member, wherein the space is at least partially filled by a compressible fluid.

7. A shock absorption device as claimed in claim 1 wherein said elastomeric member is deflected primarily in shear during the application of a load or shock to said absorption device.

8. A shock absorption device as claimed in claim 2 wherein the shock absorption device is mounted between the axle member and a stationary element surrounding the axle member.

9. A shock absorption device as claimed in claim 1 wherein said flexure mechanism is monolithically formed with said outer structural member and said inner structural member.

10. A shock absorption device as claimed in claim 1 wherein said inner and outer structural members are formed of a different material than said flexure mechanism.

11. A shock absorption device as claimed in claim 1 wherein the flexure mechanism divides the cavity into four chambers.

12. A shock absorption device as claimed in claim 1 wherein the cavity is comprised of at least a first lateral chamber and a second lateral chamber, at least some of the elastomeric member located in the first and second lateral chambers.

* * * * *